Sept. 5, 1950  F. H. BENGE  2,521,625
MOLDING APPARATUS

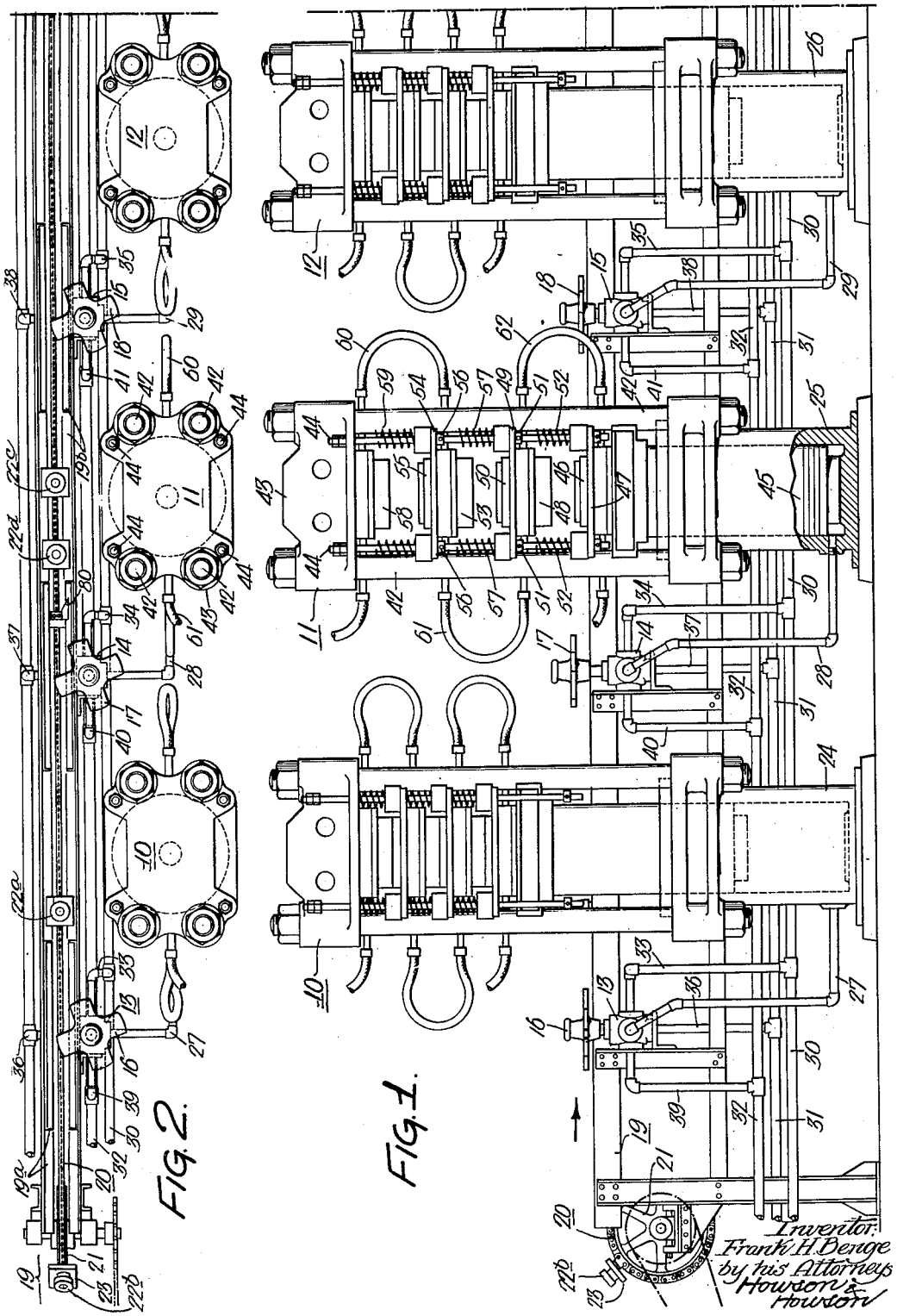

Filed Jan. 10, 1949  4 Sheets-Sheet 2

Inventor:
Frank H. Benge
by his Attorneys
Howson & Howson

Sept. 5, 1950  F. H. BENGE  2,521,625
MOLDING APPARATUS
Filed Jan. 10, 1949  4 Sheets-Sheet 3
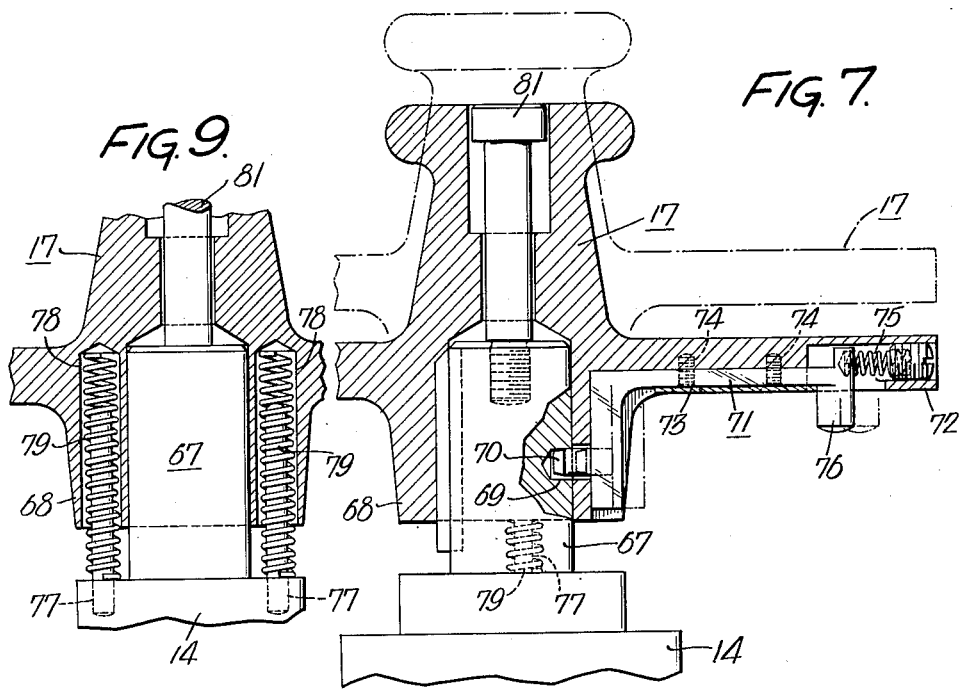
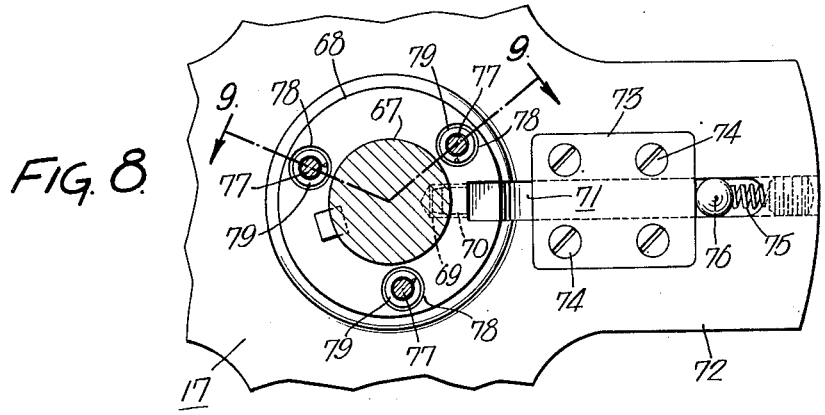
Inventor:
Frank H. Benge
by his Attorneys
Howson & Howson Sept. 5, 1950     F. H. BENGE     2,521,625
MOLDING APPARATUS Filed Jan. 10, 1949     4 Sheets-Sheet 4

Inventor:
Frank H. Benge
by his Attorneys
Howson & Howson

Patented Sept. 5, 1950

2,521,625

UNITED STATES PATENT OFFICE 2,521,625

MOLDING APPARATUS

Frank H. Benge, Norristown, Pa., assignor to Continental-Diamond Fibre Company, Newark, Del., a corporation of Delaware Application January 10, 1949, Serial No. 70,036

15 Claims. (Cl. 18—16)

This invention relates to molding apparatus, and more particularly to apparatus for molding to final form objects which have previously been preformed. While the invention is capable of general application, particularly to the final molding of preformed objects, it is especially intended for use in the manufacture of fibre gear blanks and it will be so described.

In the commercial manufacture of fibre gear blanks, it is highly desirable to preform the web and rim portions of such a gear blank, and then place the preforms together in a heated mold or press which unites and molds them into the desired integral gear blank. The said portions are commonly composed of resin-impregnated fibrous material, e. g. phenol formaldehyde resin-impregnated cotton fabric material. Preferably, the web portion is composed of macerated scrap material, and the rim portion is composed of laminated material. The preforming of the rim portion simply involves assemblage of cut laminations into ring form. The preforming of the web portion, however, involves preliminary massing and forming of the macerated material. This preforming operation may be carried out by means of the apparatus disclosed in my copending application, Serial No. 70,035, filed January 10, 1949, which is capable of forming web preforms at a rapid rate.

One object of the present invention is to provide improved molding apparatus by which it is possible to mold articles at a rapid rate.

Another object of the invention is to provide an apparatus which enables one operator to handle a substantial number of presses, thus reducing the cost of manufacture of molded articles.

A further object of the invention is to provide molding apparatus which enables rapid molding of preformed parts with a minimum amount of effort on the part of an operator. By the use of this apparatus, it is possible for a single operator to receive preforms at a rapid rate and to produce the final molded products at the same rapid rate.

Other objects and features of the invention will be apparent from the following description.

The invention may be fully understood by reference to the accompanying drawings, wherein a preferred embodiment of the apparatus is illustrated.

In the drawings:

Fig. 1 is an elevational view showing several stages of a multiple press apparatus constructed according to the present invention;

Fig. 2 is a plan view of the same;

Fig. 7 is a large scale sectional view taken along line 7—7 of Fig. 4;

Fig. 8 is a bottom view of the mechanism shown in Fig. 7;

Fig. 9 is a sectional view taken along line 9—9 of Fig. 8;

Figure 4:
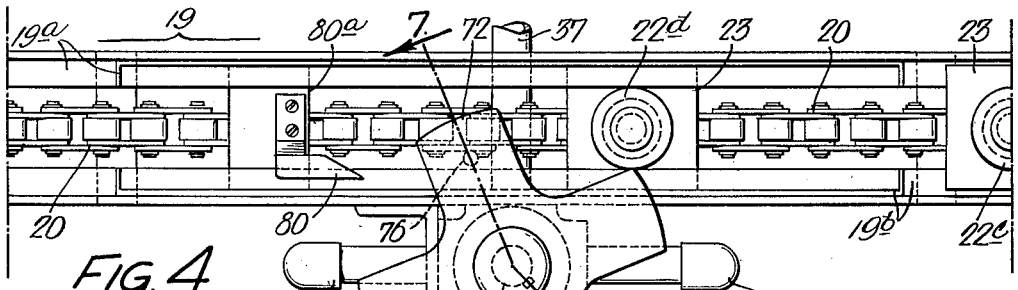
Fig. 4 is a plan view of the same.

Referring first to Figs. 1 and 2, there is shown a multiple press apparatus comprising a series of presses in substantially aligned relation, which presses are controlled by a common automatic timing mechanism. In the illustration, only three press stages are shown but in practice there will usually be a considerably greater number, of which more will be said later. In the specific illustration, the three presses shown are designated generally by respective reference characters 10, 11 and 12. The presses are actuated hydraulically and each has associated with it a four-way rotary control valve which is actuated by the common timing mechanism. The three valves for the presses shown are designated 13, 14 and 15, respectively. These valves are actuated by associated star wheels 16, 17 and 18 which are arranged for actuation by the common timing mechanism designated generally by reference character 19. The timing mechanism comprises a continuous chain 20 arranged to run between two sprocket wheels, one of which is shown at 21. Since it is assumed that more than three presses will be employed in any instance and the timing chain will extend beyond the three presses shown, the other sprocket wheel for the timing chain is not illustrated. Sprocket wheel 21 is continuously driven by suitable power means (not shown), such as an electric motor, the upper run of chain 20 moving from left to right in Figs. 1 and 2.

During a molding operation, each press goes through a three-step cycle. These steps may be designated (1) application of low pressure, e. g.

350 pounds, (2) application of high pressure, e. g. 2240 pounds, and (3) exhaust. Each of the star wheels 16, 17 and 18 has four projecting arms corresponding to the four positions of the associated valve. The reason why each valve has four positions, although there are only three steps in the operating cycle, will appear later. The timing chain 20 carries at least one set of spaced rollers 22a to 22d which engage the arms of each star wheel to actuate the associated valve through the complete cycle. Each of the rollers is mounted on a plate 23 which is carried by the timing chain. In the vicinity of each star wheel, the supporting framework of the timing mechanism 19 carries supporting guides 19a and 19b (see Fig. 5) through which each plate 23 may pass.

The presses 10, 11 and 12 are all similar in construction, and each is actuated by a hydraulic cylinder and ram located at the bottom of the press structure, the three hydraulic devices being designated 24, 25 and 26, respectively. Hydraulic pressure is supplied to said devices from the control valves through pipes or conduits 27, 28 and 29 extending from the respective valves to the respective cylinders. Three main conduits 30, 31 and 32 serve to supply and exhaust the hydraulic pressure. Conduit 30 is a low pressure main and it is connected to a source (not shown) of low pressure water. Conduit 31 is the high pressure main and it is connected to a source (not shown) of high pressure water. Conduit 32 is the exhaust main and it returns the water to the said sources. Conduits 33, 34 and 35 extend between the low pressure main and the control valves. Conduits 36, 37 and 38 extend between the high pressure main and the control valves. Conduits 39, 40 and 41 extend between the exhaust main and the control valves.

Considering the operation of the valve 13, for example, in the inoperative condition of the press 10, the valve connects conduit 27 to conduit 39 so that the cylinder 24 is open to exhaust. The first movement of the valve in the operating cycle connects conduit 27 to conduit 33, thus applying low pressure to the cylinder 24. The second movement of the valve connects conduit 27 to conduit 36, thus applying high pressure to the cylinder 24. The third movement of the valve closes off the conduit 27, and the last movement of the valve connects conduit 27 to conduit 39, thus exhausting the pressure from the cylinder 24.

In the illustration of Fig. 1, the presses 10 and 12 are shown in operative condition, while the press 11 is shown in inoperative condition. Each press comprises three complete molds so that it is adapted to mold three gear blanks during each operating cycle. Since the presses are all similar, a description of one of them will suffice. Referring to the open press 11 which best shows the construction, the three molds are supported on a framework comprising four posts 42 and a stationary head 43 supported at the top of said posts. The lower ends of the posts are fixedly supported by the cylinder 25. Four rods 44 are freely supported by the head 43 and these rods serve to support the die members as now to be described.

The lowermost die member 46 is carried by a plate 47 supported on the ram 45. The cooperating die member 48 is carried by a plate 49 which is slidably disposed on rods 44 and which also carries the lower die member 50 of the next higher mold. Plate 49 normally rests on collars 51 fixedly secured to rods 44. Springs 52, of larger diameter than the collars 51, surround the portions of the rods between plates 47 and 49. The next higher die member 53, which cooperates with die member 50, is carried by a plate 54 which also carries the lower die member 55 of the uppermost mold. Plate 54 normally rests on collars 56. Springs 57 are disposed on the portions of the rods 44 between plates 49 and 54. The uppermost die member 58 is carried by the stationary head 43. Springs 59 are disposed on the rods 44 between plates 43 and 54.

Figure 11:
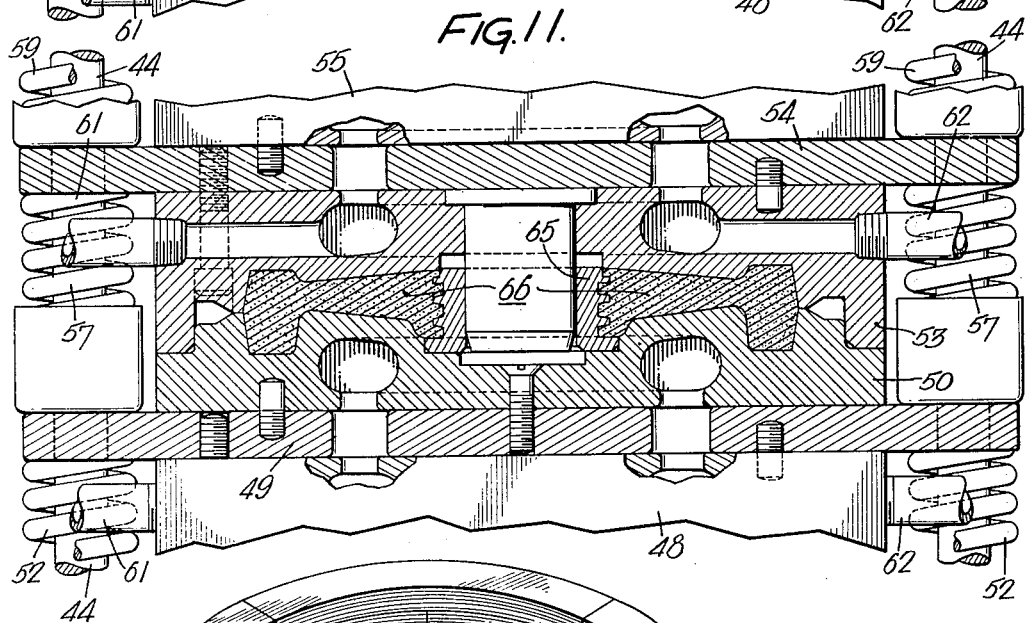
Fig. 11 is a similar view showing one of the press molds during the molding operation.

The three molds are heated by means of a heating medium, such as steam, supplied thereto in series. The four units which form the three complete molds are constructed so as to provide steam passages therethrough, as may be seen in Fig. 11, and these units are interconnected by means of flexible conduits 60, 61 and 62. These flexible conduits permit vertical movement of the die members during the molding operation.

Figure 10:
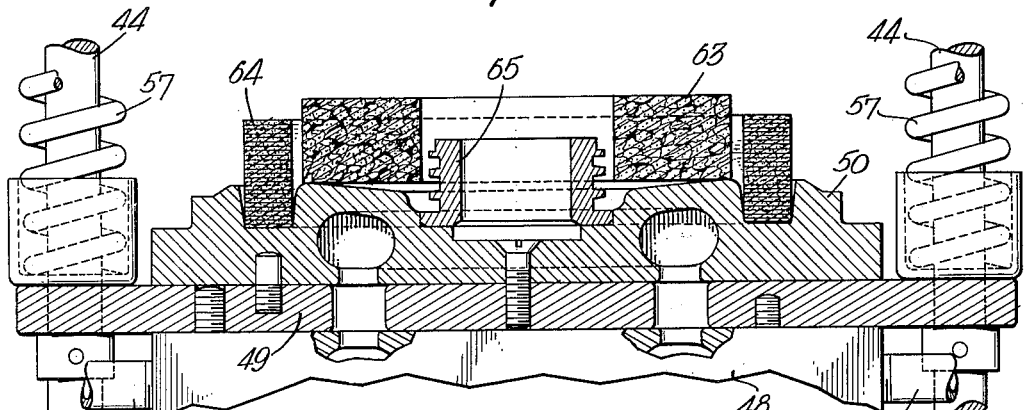
Fig. 10 is a relatively large scale elevational view showing one of the die members with the preforms disposed thereon.
Figure 12:
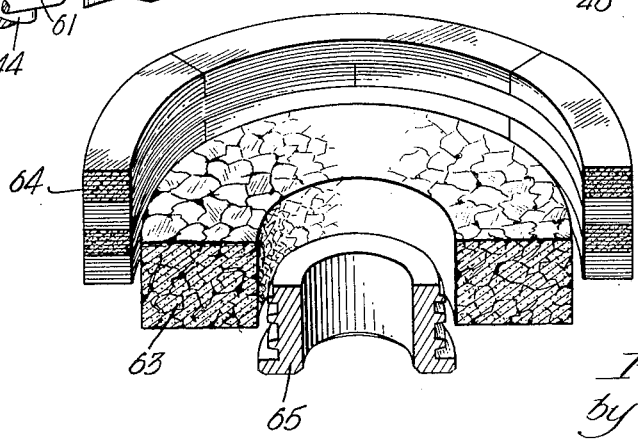
Fig. 12 is a fragmentary perspective view showing the several parts of a gear blank prior to the molding operation.

Considering the molding operation, each time one of the presses opens, the operator removes the molded gear blanks therefrom and loads the press for the next molding operation. Fig. 10 shows the parts of a gear blank in place on one of the supporting die members, e. g. die member 50, prior to the molding operation. Fig. 12 also illustrates the disposition of the parts. In both of these figures, the web preform is shown at 63, the rim preform is shown at 64 and the usual metal hub member is shown at 65. The latter member serves as a means for mounting a completed gear on a shaft or other element. As may be seen in Fig. 10, the operator places the three parts in their proper positions on the supporting die member.

Assuming that a press has been completely loaded, when low pressure is applied to the hydraulic cylinder of the press, the ram moves upward and moves the movable die members into their molding positions, at the same time compressing the associated springs. As the ram moves upward, the three molds are closed successively in upward progression. Subsequent application of high pressure during the second step of the operating cycle, as above described, causes the preformed parts of the gear blank to be molded to final form and unites said parts into an integral structure. The resulting gear blank is shown at 66 in Fig. 11. When the pressure is exhausted during the final step of the operating cycle, the ram piston drops by gravity as do also the movable die members. The compressed springs cause positive opening of the three molds. The operator then removes the three gear blanks and proceeds to reload the press.

In practice, a single operator may handle as many as nine presses. Since the timing mechanism is operating continuously and is not under control of the operator, it would be dangerous to have the presses completely under control of the timing mechanism. In such case, one of the presses might close during reloading thereof if the operator happened to be a little late in reloading the press. Another possibility is that the press might close before reloading thereof with possible damage to the parts due to the high pressure applied. In view of these possibilities, provision is made for placing the operation of each press under control of the operator.

Referring to Figs. 7 to 9, each star wheel is slidably keyed to the operating stem 67 of the associated valve. The hub portion of the star wheel has a downwardly-extending portion 68 which is slidably keyed to the valve stem 67. The valve stem is recessed, as at 69, to receive a latch pin 70 mounted on an L-shaped slide 71 carried by an arm 72 of the star wheel. The arm 72 is the one which initiates the first step of each operating cycle. The L-shaped slide 71 is disposed in recesses provided in arm 72 and the hub portion 66, and said slide is slidably supported by a plate 73 secured to arm 72 by screws 74. A spring 75, carried by arm 72, urges the slide 71 inward. The slide has a depending button 76 by which it is moved outward as presently to be described.

As best shown in Figs. 8 and 9, each valve carries upwardly-projecting pins 77 which extend into recesses 78 in the hub portion of the associated star wheel. Springs 79 are disposed in the latter recesses about said pins and urge the star wheel upward.

Figure 6:
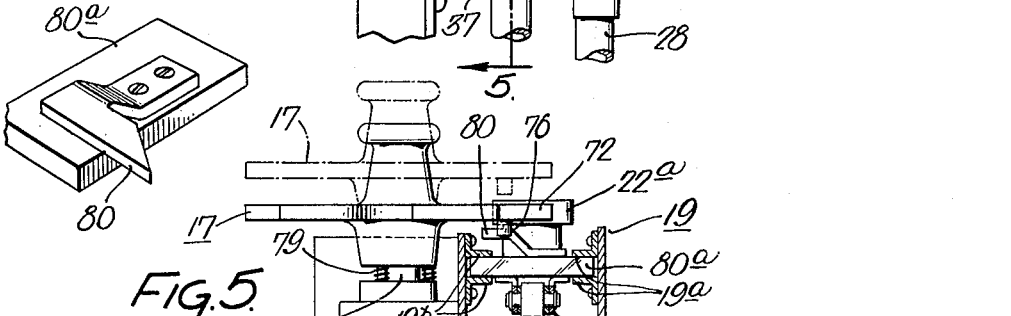
Fig. 6 is a perspective view of an element of the control mechanism.

As shown in Figs. 1 and 4, the timing chain carries a cam element 80 which is adapted to cooperate with the button 76. The cam element is located on the timing chain just behind the roller 22d which moves each star wheel and valve to the exhaust position. As shown in Fig. 6, the cam element is mounted on a plate 80a which is carried by the timing chain.

Each star wheel is movable between two positions as indicated by the solid and dotted line representations in Fig. 7. In the lower position, the arms of the star wheel are engageable by the rollers 22a to 22d on the timing chain, but in the upper position the arms of the star wheel are raised out of engageable relation with said rollers. When the star wheel is manually depressed it is latched in lower position against the action of springs 79. Then when the cam element 80 engages the button 76, the latch is released and the star wheel is moved upward by springs 79. A headed pin 81, carried by the valve stem 67, limits the upward movement of the star wheel.

Figure 3:
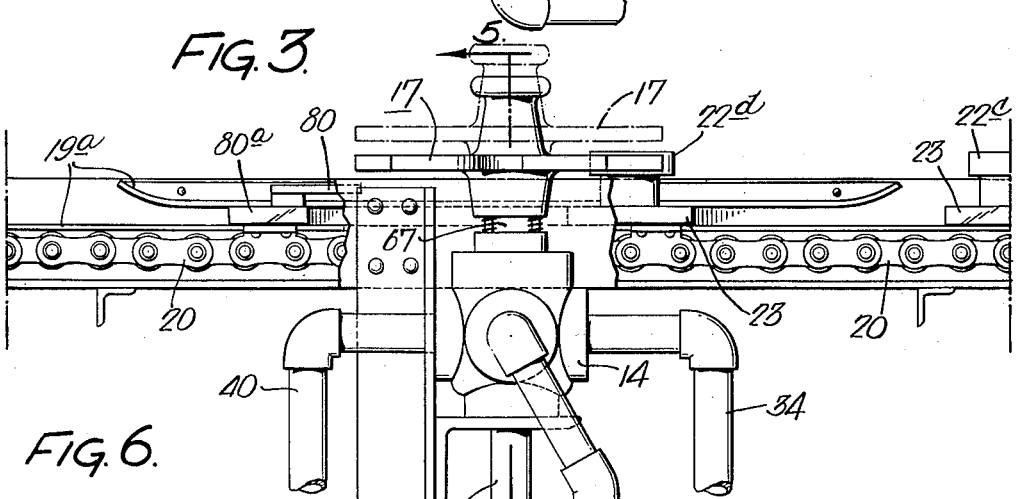
Fig. 3 is a relatively large scale elevational view showing the control mechanism for one of the presses.
Figure 5:
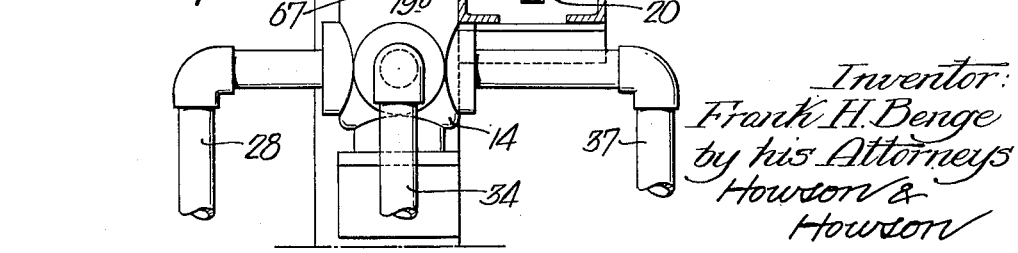
Fig. 5 is a sectional view taken along the line 5—5 of Fig. 3.

The manner in which each press is automatically rendered inoperative at the end of each cycle of operation may be seen with the aid of Figs. 3 to 5. At the completion of a molding operation, the star wheel is in the position shown in Fig. 4, with the arm 72 in position to be engaged by the next roller on the timing chain. However, the cam 80 trips the star wheel latch, through the medium of button 76, and causes the star wheel to move to its raised position, as represented in dotted outline in Fig. 3, before the next roller is able to engage arm 72 and move the star wheel. With the star wheel released and in its raised position, it is out of engageable relation with the rollers, and therefore the press associated with the star wheel is temporarily inoperative. It should be noted that the star wheel remains in the angular position shown in Fig. 4.

After the operator has reloaded the press, he manually depresses the star wheel to its lowered position as shown in the solid line illustrations of Figs. 3 and 5. Throughout the new operating cycle, the star wheel is latched in its lower position so that the associated valve is operated through a complete cycle. After completion of the operating cycle, the star wheel latch is again released as above described.

Considering the operation of the complete apparatus, for the sake of simplicity, it may be assumed that the number of presses and the speed of operation of the timing chain are such that a single set of actuating rollers may be employed, as shown in Fig. 2. Remembering that the upper run of the timing chain is moving from left to right in Figs. 1 and 2, the operating cycle of each press is initiated by the roller 22a which causes application of low pressure to the hydraulic cylinder of each press. The roller 22b causes application of high pressure to the hydraulic cylinder of each press, and the high pressure is maintained until the roller 22d initiates the exhaust step of the cycle. It will be seen that the application of high pressure continues for a considerable period of time, e. g. fifteen minutes, due to the effective spacing of rollers 22b and 22d. Immediately ahead of the roller 22d on the timing chain is the roller 22c which operates each valve to a close-off position as previously described. It has been found to be advantageous to use four-way valves with a close-off position between the high pressure and exhaust positions. This enables a wide angular spacing of the high pressure and exhaust ports. Immediately following the roller 22d is the cam 80 which trips the latch of each star wheel, as hereinbefore described.

During each complete operating cycle of the timing mechanism, the entire line of presses goes through a complete molding operation. Starting with the first press, the operator loads the presses successively, keeping ahead of the low pressure applying roller 22a. After loading each press, the operator latches the star wheel thereof so that the star wheel is in position to be engaged by the roller 22a and the succeeding rollers in the operating sequence. After loading the last press, the operator returns to the first press and repeats the entire operation.

In the illustration of Figs. 1 and 2, the press 10 has just commenced a new operating cycle, the press 11 is ready to be reloaded, and the press 12 has almost completed an operating cycle.

From the above description, it will be seen that there are a number of factors which enter into the construction or design of the apparatus in any instance. These include the number and spacing of the presses to be operated, the number of operators, the speed with which an operator can be expected to reload the presses, the molding time required, the speed at which it is desired to drive the timing chain, etc. As mentioned previously, it has been found that a single operator can handle nine presses, and where there are that many presses, two equally spaced sets of actuating rollers may be employed on the timing chain. This means that the entire line of presses will be operated through two complete operating cycles during each complete cycle of movement of the timing chain.

In an actual installation which has been in use, eighteen presses are operated by two operators each handling nine presses. A single timing mechanism is employed, and there are four equally spaced sets of rollers on the timing chain. Thus, it will be apparent that the apparatus is capable of considerable extension.

The apparatus of the present invention is particularly useful in conjunction with the preforming apparatus of my above-mentioned copending application. The said preforming apparatus is capable of producing web preforms at the rate of three per minute, and by means of the present apparatus, it is easily possible to produce gear blanks at the same rate. In fact, the present apparatus may comprise a sufficient number of presses to handle the preforms from a number of machines of the character disclosed in the said copending application.

While in practice, the apparatus of the present invention would probably always comprise a plurality of presses controlled by a common timing means, it is within the purview of the invention to employ a single press controlled by such timing means.

It will be understood that the form of the apparatus illustrated in the drawings is merely representative and is not intended to limit the invention.

I claim:

1. Molding apparatus, comprising at least one press operable by pressurized fluid, means for supplying pressurized fluid to said press, a valve operable to successive positions to control the supply of the pressurized fluid to said press, a motor-driven continuously-operating timing control member carrying spaced elements, a star wheel manually settable for engagement by said elements to move said valve to said positions, thereby to effect operation of said press, and means for automatically moving said star wheel out of engageable relation with said elements after completion of a molding operation.

2. Molding apparatus, comprising at least one press operable by pressurized fluid, means for supplying pressurized fluid to said press, a valve operable to successive positions to control the supply of the pressurized fluid to said press, a motor-driven continuous timing chain carrying spaced elements, a star wheel manually settable for engagement by said elements to move said valve to said positions, thereby to effect operation of said press, and means for automatically moving said star wheel out of engageable relation with said elements after completion of a molding operation.

3. Molding apparatus, comprising at least one press operable by pressurized fluid, means for supplying pressurized fluid to said press, a valve operable to successive positions to control the supply of the pressurized fluid to said press, a motor-driven continuous timing chain carrying spaced elements, a star wheel operatively associated with said valve, latch means adapted to hold said star wheel in engageable relation with said elements, whereby said elements actuate said star wheel to move said valve to said positions and thus effect operation of said press, means urging said star wheel out of engageable relation with said elements, and cam means on said chain for automatically releasing said latch means after completion of a molding operation, thus permitting the star wheel to move out of engageable relation with said elements after completion of a molding operation.

4. Molding apparatus, comprising at least one press having a hydraulic cylinder and ram for operation of the press, means including a rotary valve for applying low and high pressure water to said cylinder and for exhausting the latter all in succession, continuously operating power-driven timing control means, an actuator for said valve manually settable for engagement by said control means to effect operation of said press, and means for automatically moving said actuator out of engageable relation with said control means after completion of a molding operation.

5. Molding apparatus, comprising at least one press having a hydraulic cylinder and ram for operation of the press, means including a rotary valve for applying low and high pressure water to said cylinder and for exhausting the latter all in succession, a motor-driven continuously-operating timing control member carrying spaced elements, a star wheel manually settable for engagement by said elements to actuate said valve, thereby to effect operation of said press, and means for automatically moving said star wheel out of engageable relation with said elements after completion of a molding operation.

6. Molding apparatus, comprising at least one press having a hydraulic cylinder and ram for operation of the press, means including a rotary valve for applying low and high pressure water to said cylinder and for exhausting the latter all in succession, a motor-driven continuously-operating timing control member carrying spaced elements, a star wheel operatively associated with said valve, latch means adapted to hold said star wheel in engageable relation with said elements, whereby said elements actuate said star wheel to operate said valve and thus cause operation of said press, means urging said star wheel out of engageable relation with said elements, and cam means on said member for automatically releasing said latch means after completion of a molding operation, thus permitting the star wheel to move out of engageable relation with said elements after completion of a molding operation.

7. Molding apparatus, comprising a plurality of presses operable by pressurized fluid, a plurality of valves arranged respectively to control the supply of the pressurized fluid to said presses, continuously operating power-driven timing control means common to said presses, an actuator for each valve manually settable for engagement by said control means to effect operation of the associated press, and means for automatically moving each actuator out of engageable relation with said control means after completion of a molding operation by the associated press.

8. Molding apparatus, comprising a plurality of presses operable by pressurized fluid, a plurality of valves arranged respectively to control the supply of the pressurized fluid to said presses, a motor-driven continuously operating timing control member common to said presses, said member carrying spaced elements, a star wheel actuator for each valve manually settable for engagement by said elements to effect operation of the associated press, and means including other elements on said member for automatically moving each star wheel out of engageable relation with the first-mentioned elements after completion of a molding operation by the associated press.

9. Molding apparatus, comprising a plurality of presses operable by pressurized fluid, a plurality of valves arranged respectively to control the supply of the pressurized fluid to said presses, a motor-driven continuously operating timing control member common to said presses, said member carrying spaced elements, a star wheel operatively associated with each valve, latch means adapted to hold each star wheel in engageable relation with said elements, whereby said elements actuate each star wheel to move the associated valve and thus effect operation of the associated press, means urging each star wheel out of engageable relation with said elements, and cam means on said member for automatically releasing the latch means of each star wheel after completion of a molding operation by the associated press, thus permitting the star wheel to move out of engageable relation with said elements.

10. Molding apparatus, comprising a row of spaced presses operable by pressurized fluid, a row of spaced valves arranged respectively to control the supply of pressurized fluid to said presses, a power-driven timing member common to said presses and arranged to run in proximity to said valves, said member carrying spaced elements, an actuator for each of said valves manually settable for engagement by said elements to effect operation of the associated press and means including other elements on said member for automatically moving each actuator out of engageable relation with the first-mentioned elements after completion of a molding operation by the associated press.

11. Molding apparatus, comprising a row of spaced presses operable by pressurized fluid, a row of spaced valves arranged respectively to control the supply of pressurized fluid to said presses, a power-driven timing member common to said presses and arranged to run in proximity to said valves, said member carrying spaced elements, a star wheel actuator for each of said valves manually settable for engagement by said elements to effect operation of the associated press, and means including other elements on said member for automatically moving each star wheel out of engageable relation with the first-mentioned elements after completion of a molding operation by the associated press.

12. Molding apparatus, comprising a row of spaced presses operable by pressurized fluid, a row of spaced valves arranged respectively to control the supply of pressurized fluid to said presses, a power-driven timing member common to said presses and arranged to run in proximity to said valves, said member carrying spaced elements, a star wheel operatively associated with each valve, latch means adapted to hold each star wheel in engageable relation with said elements, whereby said elements actuate each star wheel to move the associated valve and thus effect operation of the associated press, means urging each star wheel out of engageable relation with said elements, and cam means on said member for automatically releasing the latch means of each star wheel after completion of a molding operation by the associated press, thus permitting the star wheel to move out of engageable relation with said elements.

13. Molding apparatus, comprising a row of spaced presses each including a plurality of molds and a common fluid pressure-responsive operating means, means for supplying low and high pressure fluid to the presses, a row of spaced valves arranged respectively to control said presses, each valve being operable to effect successive application of the low and high fluid pressures to the operating means of the associated press, a power-driven timing member common to said presses and arranged to run in proximity to said valves, said member carrying spaced elements, an actuator for each of said valves manually settable for engagement by said elements to effect operation of the associated press, and means including other elements on said member for automatically moving each actuator out of engageable relation with the first-mentioned elements after completion of a molding operation by the associated press.

14. Molding apparatus, comprising a row of spaced presses each including a plurality of molds and a common fluid pressure-responsive operating means, means for supplying low and high pressure fluid to the presses, a row of spaced valves arranged respectively to control said presses, each valve being operable to effect successive application of the low and high fluid pressures to the operating means of the associated press, a power-driven timing member common to said presses and arranged to run in proximity to said valves, said member carrying spaced elements, a star wheel actuator for each of said valves manually settable for engagement by said elements to effect operation of the associated press, and means including other elements on said member for automatically moving each star wheel out of engageable relation with the first-mentioned elements after completion of a molding operation by the associated press.

15. Molding apparatus, comprising a row of spaced presses each including a plurality of molds and a common fluid pressure-responsive operating means, means for supplying low and high pressure fluid to the presses, a row of spaced valves arranged respectively to control said presses, each valve being operable to effect successive application of the low and high fluid pressures to the operating means of the associated press, a power-driven timing member common to said presses and arranged to run in proximity to said valves, said member carrying spaced elements, a star wheel operatively associated with each valve, latch means adapted to hold each star wheel in engageable relation with said elements, whereby said elements actuate each star wheel to move the associated valve and thus effect operation of the associated press, means urging each star wheel out of engageable relation with said elements, and cam means on said member for automatically releasing the latch means of each star wheel after completion of a molding operation by the associated press, thus permitting the star wheel to move out of engageable relation with said elements.

FRANK H. BENGE.

REFERENCES CITED

The following references are of record in the file of this patent:

UNITED STATES PATENTS

| Number | Name | Date |
| --- | --- | --- |
| 1,569,002 | Crudginton et al. | Jan. 12, 1926 |
| 1,628,057 | Nitchie | May 10, 1927 |
| 1,930,931 | Fernberg | Oct. 17, 1933 |